Patented Feb. 6, 1923.

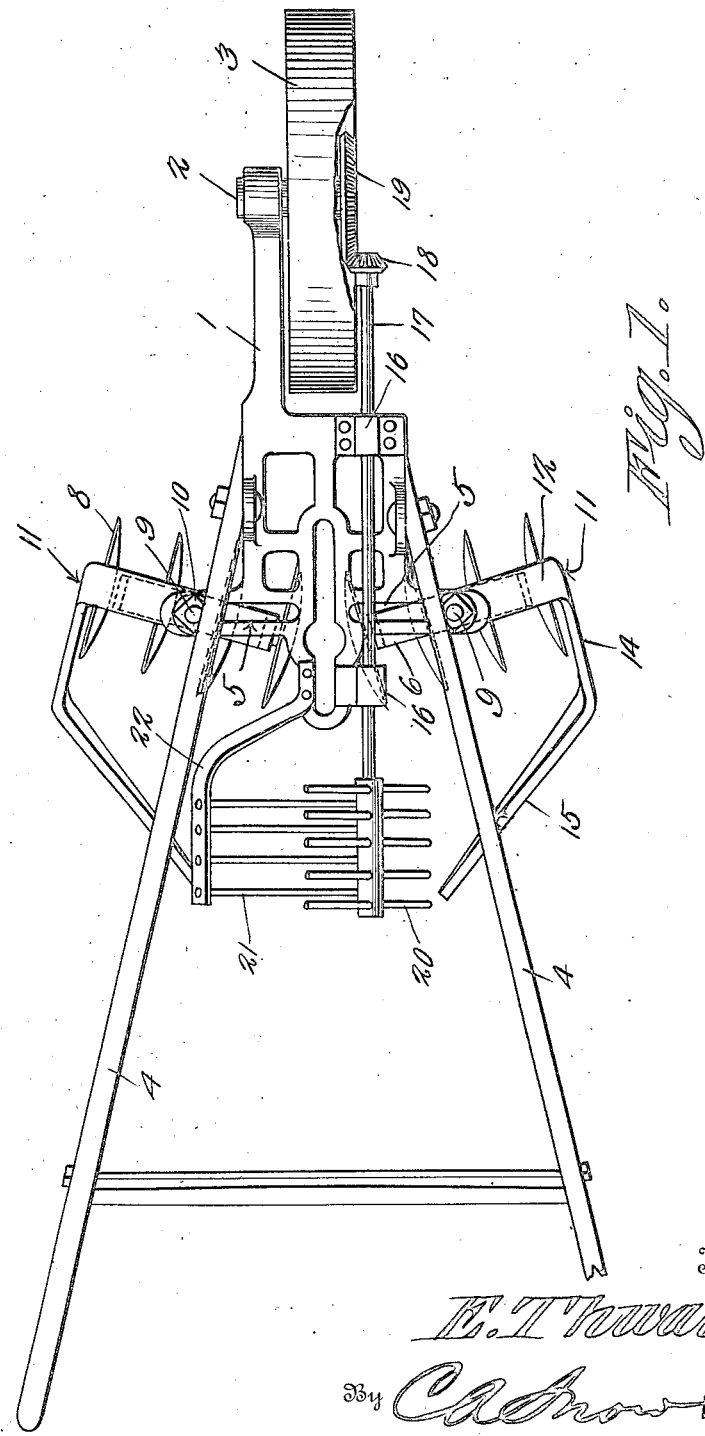

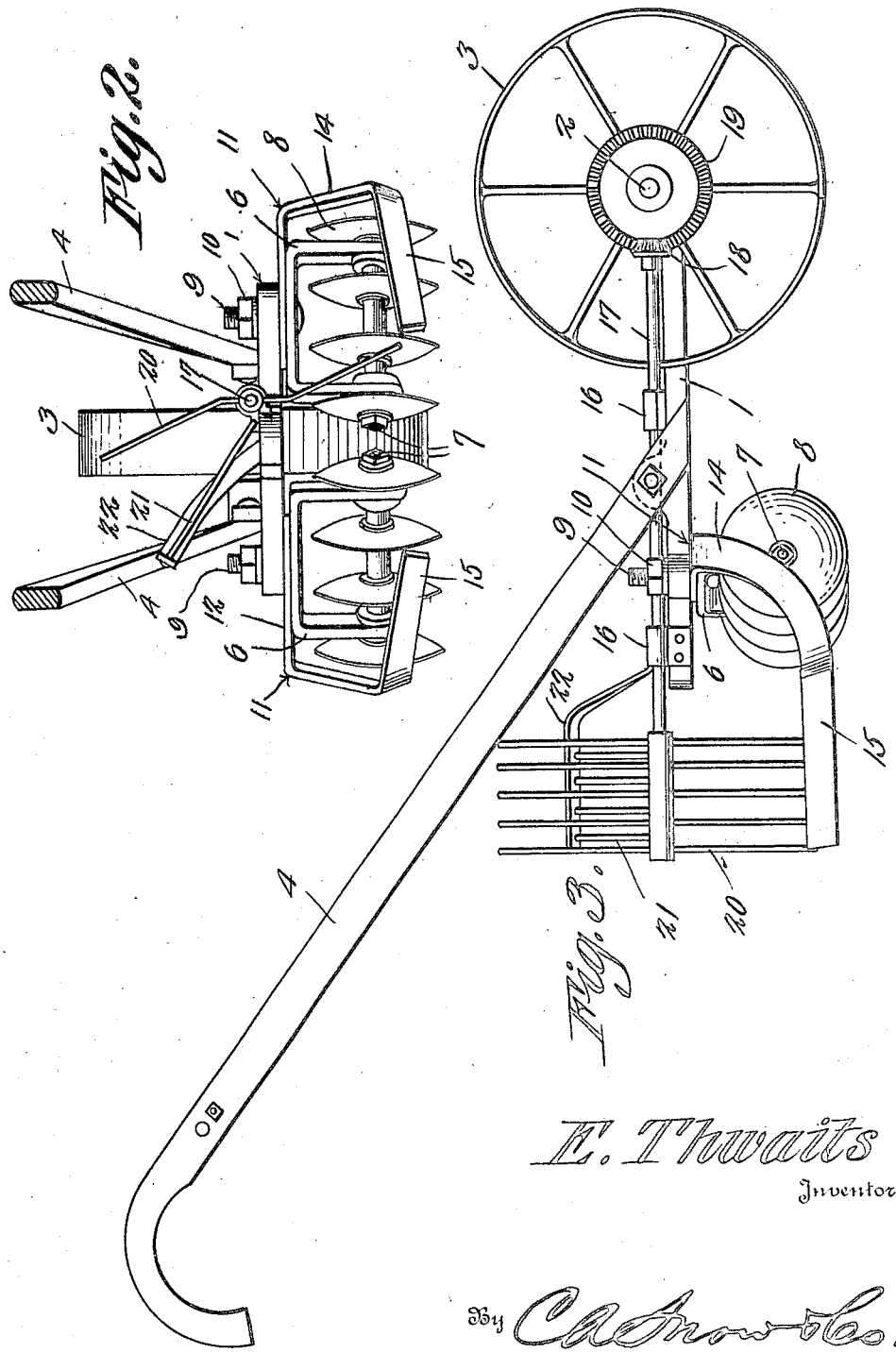

1,444,284

UNITED STATES PATENT OFFICE.

ELMER THWAITS, OF LEESBURG, INDIANA.

DISK PLOW.

Application filed May 16, 1921. Serial No. 469,929.

*To all whom it may concern:*

Be it known that I, ELMER THWAITS, a citizen of the United States, residing at Leesburg, in the county of Kosciusko and State of Indiana, have invented a new and useful Disk Plow, of which the following is a specification.

The device forming the subject matter of this application is adapted to be applied to any standard form of cultivator or garden wheel hoe, to enable the operator to cultivate the row and throw the weeds away from the row, it being possible, by reversing the cultivating disks, to cast the dirt back on the row.

The invention aims to provide a simple but efficient mechanism for carrying out the ends above alluded to, and to provide, in addition, rotary means for weeding at the rear of the device, the last specified weeding mechanism being driven from the ground wheel.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in top plan, a device constructed in accordance with the invention, parts being broken away; Figure 2 is a transverse section, in the nature of a rear elevation, and Figure 3 is a side elevation.

The device forming the subject matter of this application may be assembled with cultivators of widely different sorts, but by way of illustration, there is shown in the drawings, a cultivator including a main frame 1 in the form of an integral plate, carrying an axle 2 supporting for rotation, a ground wheel 3, rearwardly extended handles 4 being connected to the frame 1. Adjacent to its rear end, the frame 1 is provided with transverse slots 5.

Inverted U-shaped auxiliary frames 6 are disposed below the main frame 1. In each frame 6 a shaft 7 is mounted, each shaft carrying any desired number of rotatable disks or cultivating elements 8. Each auxiliary frame 6 has an upstanding threaded stud 9 extended through one of the slots 5 in the frame 1, nuts 10 being mounted on the upper ends of the studs, the nuts cooperating with the frame 1. It will be clear that the frames 6 may be set at any desired angle with respect to the line of advance of the implement, thereby enabling the disks 8 either to cut the weeds outwardly and away from the row, or to permit the disks to cast the dirt backwardly, from between the rows, upon the plants in the row.

Levelers 11 are provided, each leveler including an upper arm 12, a downwardly and rearwardly inclined side member 14 and an inwardly extended foot 15. The upper arms of the levelers 11 are mounted on the studs 9 and are located between the upper portions of the frames 6 and the main frame 1. It is obvious that the levelers may be adjusted inwardly or outwardly, with respect to the median line of the implement, and, likewise, both the levelers 11 and the frames 6, together with the disks 8 carried by the frames, may be moved inwardly or outwardly, the studs or securing elements 9 being adjustable in the transverse slots 5. The levelers 11, and, specifically, the feet thereof, serve to smooth down and distribute the earth at the rear of the device.

Bearings 16 are mounted on the main frame 1, a shaft 17 being journaled for rotation in the bearings. A beveled pinion 18 is secured to the forward end of the shaft 17, the pinion 18 meshing into a beveled gear 19, connected to the ground wheel 3 to rotate therewith. On the rear end of the shaft 17 are mounted transverse fingers 20, adapted to pass between cleaning rods 21, carried by an angular bracket 22, secured to the rear end of the frame 1.

When the ground wheel 3 is rotated, motion will be transmitted to the shaft 17 by way of the beveled gear 19 and the beveled pinion 18, the fingers 20 operating on the soil, in an obvious way, for the removal of weeds and the like, the rods 21 serving to detach the weeds which have been loosened by the fingers 20.

I claim:—

In a device of the class described, a main frame, in the form of an integral plate, provided adjacent to its rear end with transversely elongated slots disposed on opposite sides of the median plane of the frame; handles connected to the frame; a ground wheel journaled on the forward end of the frame, the handles being disposed between the ground wheel and the slots; inverted U-shaped auxiliary frames disposed beneath the main frame; combined tightening and pivot devices connected to the intermediate portions of the auxiliary frames and adjustable in the slots longitudinally thereof to permit the auxiliary frames to be shifted bodily inwardly and outwardly, transversely of the draft line, the auxiliary frames being pivotally adjustable to vary the angle between them and the draft line; cultivator disks journaled on the auxiliary frames; and levelers having their upper ends mounted on the combined tightening and pivot devices and bound thereby between the main and auxiliary frames, for swinging adjustment, the levelers extending downwardly and rearwardly, outwardly of the auxiliary frames, and being provided at their lower rear ends with inwardly extended feet prolonged behind the cultivator disks.

In testimony that I claim the foregoing as my own, I have hereto affixed my signature in the presence of two witnesses.

ELMER THWAITS.

Witnesses:
JOHN D. WIDAMAN,
LON H. HAYMOND.